(No Model.)
R. T. HUGGINS.
COTTON CHOPPER AND CULTIVATOR.
No. 378,960. Patented Mar. 6, 1888.
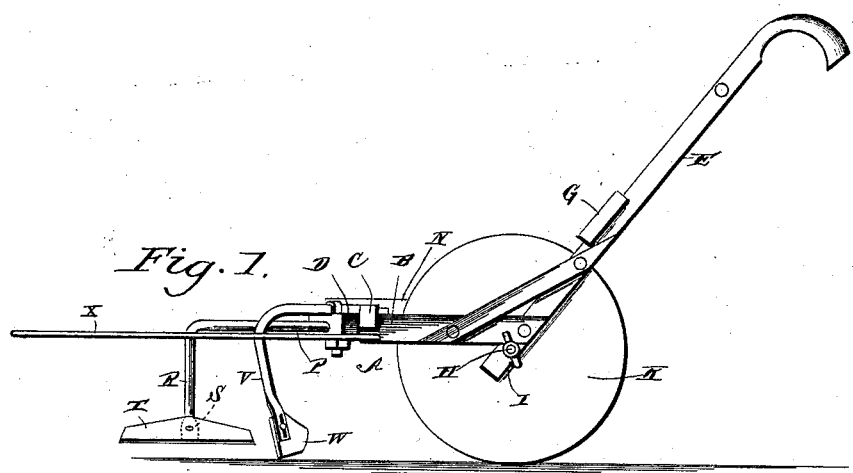
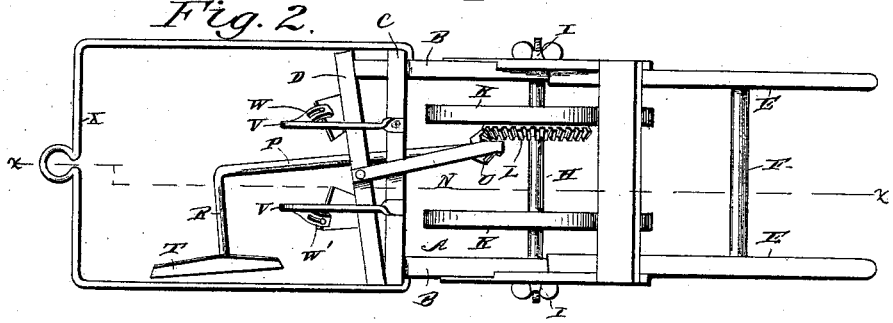
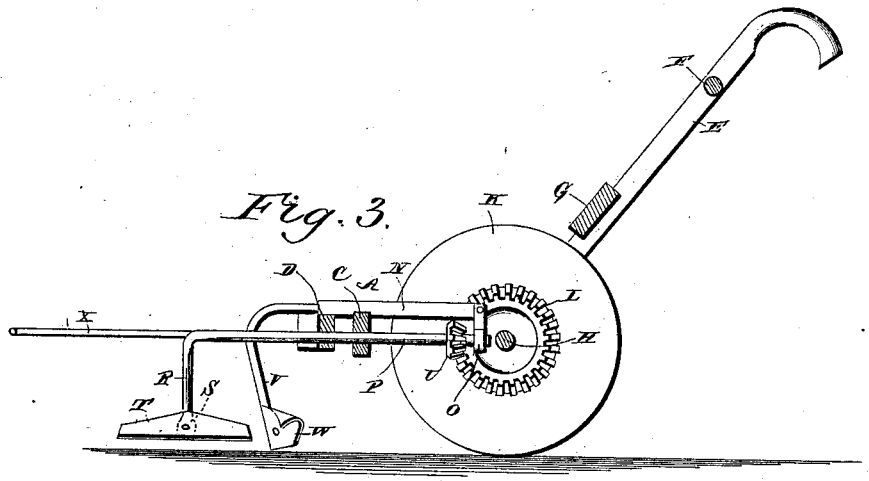
WITNESSES
INVENTOR.
Robert T. Huggins.
by C. A. Snow & Co.
Attorneys

UNITED STATES PATENT OFFICE.

ROBERT THOMAS HUGGINS, OF DARLINGTON, SOUTH CAROLINA.

COTTON CHOPPER AND CULTIVATOR.

SPECIFICATION forming part of Letters Patent No. 378,960, dated March 6, 1888.

Application filed May 5, 1887. Serial No. 237,267. (No model.)

*To all whom it may concern:*

Be it known that I, ROBERT THOMAS HUGGINS, a citizen of the United States, residing at Darlington, in the county of Darlington and State of South Carolina, have invented a new and useful Improvement in Cotton Choppers and Cultivators, of which the following is a specification.

My invention relates to an improvement in cotton-choppers; and it consists in the peculiar construction and combination of devices, that will be more fully set forth hereinafter, and particularly pointed out in the claims.

In the drawings, Figure 1 is a side elevation of a cotton-chopper embodying my improvements. Fig. 2 is a top plan view of the same. Fig. 3 is a vertical longitudinal sectional view taken on the line $x$ $x$ of Fig. 2.

A represents a frame, which comprises a pair of longitudinal beams, B, the cross-bar C, connecting the same at a distance from their front ends, and an oblique cross-bar, D, connecting the extreme front ends of the said beams.

To the rear ends of the beams B are attached the lower ends of rearward and upward extending handles E, which are connected together near their upper ends by a cross-bar, F, and by a cross-board, G, at a suitable distance from their lower ends.

H represents a transverse shaft, which is journaled in openings in the rear ends of the beams B. The said shaft has a longitudinal movement in the said beams, and is provided with projecting screw-threaded extremities, on which are screwed clamping-nuts I. To the said shaft are secured a pair of driving-wheels, K, which are arranged at a slight distance from the inner side of the beams B. To the inner side of one of the said driving-wheels is secured a gear-wheel, L.

N represents a rearward-extending arm, which is attached at its front end to the cross-bars C and D. This arm N is arranged obliquely and extends nearly to the front side of the wheel L, and is provided at its inner end with a vertical depending bracket-arm, O.

P represents a shaft, which has its lower end journaled in the rear of the bracket-arm, and extends forward and is journaled in openings made in the cross-bars C and D, and has its front end, which projects beyond the front end of the frame, bent at right angles to form an arm, R, the lower end of which is bent outward at one side at right angles to form the supporting-foot S.

T represents a chopping blade or hoe, which has its central portion bolted or otherwise secured to the foot S.

It will be observed by reference to Fig. 2 that the shaft P is arranged obliquely in the frame and that the chopping blade or hoe is arranged at a slight angle with relation to the said shaft, so that the cutting-edge of the hoe is nearly, but not quite, parallel with the sides of the frame. To the rear end of the shaft P is rigidly secured a miter-wheel, U, that is adapted to mesh with the wheel L.

V represents a pair of standards, which have their upper ends bent rearwardly and secured on the upper side of the cross-bars C and D at suitable distances from opposite sides of the shaft P. To the lower ends of the said standards are attached scrapers W, which are arranged obliquely with relation to the frame and converge rearwardly toward each other. The upper rear corners of the said scrapers are curved inward and downward, as shown.

From the foregoing description it will be understood that when the machine is drawn forward the scrapers will cultivate the earth on both sides of the row of plants and will form a ridge.

X represents a bail, which is attached to the side beams, B, extends forward therefrom for a suitable distance, and has an eye, I, formed at its front end slightly to one side of the center, the said eye being adapted for the attachment of the whiffletree to which the draft-animals are harnessed.

The operation of my invention is as follows: By turning the set-screws on the ends of the main shaft the latter may be moved longitudinally, so as to cause the wheel L to mesh with the pinion on the rear end of the shaft P. As the machine advances, the rotation of the wheel L is communicated to the shaft P, and the arm at the front end thereof describes a circle, the plane of which is obliquely arranged to the path of the machine, and this rotary motion of the shaft causes the chopping-hoe to chop and thin out the cotton-plants at suitable regular distances, and thereby only leave enough of the cotton-plants standing to make a crop. At the same time that the plants are chopped and thinned the cultivating-shovels, previously described, form a ridge of earth on both sides of the row of plants and thoroughly cultivate the same, thus materially hastening their growth.

If it be desired to cultivate the plants without chopping and thinning them, this may be accomplished by moving the main shaft longitudinally a sufficient distance to cause the wheel L to be disengaged from the pinion on the rear end of the shaft P.

Having thus described my invention, I claim—

1. The combination, in a cotton-chopper, of the frame A, having the handles, the cross-bar C near its front end, the oblique bar D, having the rearward-extending oblique arm N, provided with a depending bracket-arm, the shaft H, journaled in frame A and having the supporting-wheels and the gear-wheel L, the shaft P, arranged obliquely and journaled in the depending bracket-arm and in the cross-bars C and D, said shaft having arm R, provided with the foot S, to which the hoe is attached, the pinion U, secured to shafts P and working with wheel L, and the standards having the scrapers, substantially as described.

2. In a cotton chopper, the frame carrying the rotating chopping-hoe and having the standards V, provided at their lower ends with the rearward-converging obliquely-arranged scrapers W, the rear upper corners of which are bent inward and downward, substantially as described.

In testimony that I claim the foregoing as my own I have hereto affixed my signature in presence of two witnesses.

ROBERT THOMAS HUGGINS.

Witnesses:
A. L. SIMMONS,
J. A. HUGGINS.